US009081948B2

(12) United States Patent
Magne

(10) Patent No.: US 9,081,948 B2
(45) Date of Patent: *Jul. 14, 2015

(54) CONFIGURABLE SMARTCARD

(75) Inventor: John Magne, Mountain View, CA (US)

(73) Assignee: Red Hat, Inc., Raleigh, NC (US)

(*) Notice: Subject to any disclaimer, the term of this patent is extended or adjusted under 35 U.S.C. 154(b) by 958 days.

This patent is subject to a terminal disclaimer.

(21) Appl. No.: 11/685,265

(22) Filed: Mar. 13, 2007

(65) Prior Publication Data

US 2008/0229401 A1  Sep. 18, 2008

(51) Int. Cl.
G06F 21/34 (2013.01)
H04L 29/06 (2006.01)
H04L 9/32 (2006.01)
G06Q 20/34 (2012.01)

(52) U.S. Cl.
CPC .............. *G06F 21/34* (2013.01); *H04L 9/3234* (2013.01); *H04L 63/0807* (2013.01); *H04L 63/0823* (2013.01); *H04L 63/0853* (2013.01); *G06Q 20/34* (2013.01)

(58) Field of Classification Search
CPC ... G06F 21/34; H04L 63/0853; G07F 7/1008; G07F 7/08
See application file for complete search history.

(56) References Cited

U.S. PATENT DOCUMENTS

| 4,108,367 A | 8/1978 | Hannan |
| 4,849,614 A | 7/1989 | Watanabe et al. |
| 4,924,330 A | 5/1990 | Seamons et al. |
| 5,247,163 A | 9/1993 | Ohno et al. |
| 5,355,414 A | 10/1994 | Hale et al. |
| 5,499,371 A | 3/1996 | Henninger et al. |
| 5,594,227 A | 1/1997 | Deo |
| 5,631,961 A | 5/1997 | Mills et al. |
| 5,666,415 A | 9/1997 | Kaufman |
| 5,721,781 A * | 2/1998 | Deo et al. ................ 705/67 |
| 5,745,576 A | 4/1998 | Abraham et al. |
| 5,745,678 A | 4/1998 | Herzberg et al. |
| 5,768,373 A | 6/1998 | Lohstroh et al. |
| 5,841,866 A * | 11/1998 | Bruwer et al. ............ 705/66 |
| 5,862,310 A | 1/1999 | Crawford et al. |
| 5,923,884 A | 7/1999 | Peyret et al. |
| 5,937,066 A | 8/1999 | Gennaro et al. |
| 5,943,423 A | 8/1999 | Muftic |
| 5,991,411 A | 11/1999 | Kaufman et al. |
| 5,991,882 A | 11/1999 | O'Connell |
| 6,005,942 A | 12/1999 | Chan et al. |
| 6,005,945 A | 12/1999 | Whitehouse |

(Continued)

FOREIGN PATENT DOCUMENTS

| WO | 9724831 | 7/1997 |
| WO | 0048064 A1 | 8/2000 |

(Continued)

OTHER PUBLICATIONS

Schneier, Bruce. Applied Cryptography, Second Edition. 1996 John Wiley and Sons, pp. 480-481.

(Continued)

*Primary Examiner* — Alexander Lagor
(74) *Attorney, Agent, or Firm* — Lowenstein Sandler LLP

(57) ABSTRACT

An embodiment relates generally to a method of using a token. The method includes embedding the token with at least one action and detecting a presence of the token. The method also includes authenticating the token; and executing an applet in response to a valid authentication of the token.

15 Claims, 5 Drawing Sheets

(56) References Cited

U.S. PATENT DOCUMENTS

| | | | |
|---|---|---|---|
| 6,011,847 | A | 1/2000 | Follendore, III |
| 6,016,476 | A | 1/2000 | Maes et al. |
| 6,044,155 | A | 3/2000 | Thomlinson et al. |
| 6,072,876 | A | 6/2000 | Obata et al. |
| 6,141,420 | A | 10/2000 | Vanstone et al. |
| 6,178,507 | B1 | 1/2001 | Vanstone |
| 6,179,205 | B1 | 1/2001 | Sloan |
| 6,226,744 | B1 | 5/2001 | Murphy et al. |
| 6,377,825 | B1 | 4/2002 | Kennedy et al. |
| 6,490,680 | B1 | 12/2002 | Scheidt et al. |
| 6,502,108 | B1 | 12/2002 | Day et al. |
| 6,539,093 | B1 | 3/2003 | Asad et al. |
| 6,636,975 | B1 | 10/2003 | Khidekel et al. |
| 6,643,701 | B1 | 11/2003 | Aziz et al. |
| 6,687,190 | B2 | 2/2004 | Momich et al. |
| 6,691,137 | B1 | 2/2004 | Kishi |
| 6,698,654 | B1 | 3/2004 | Zuppicich |
| 6,734,886 | B1 | 5/2004 | Hagan et al. |
| 6,760,752 | B1 | 7/2004 | Liu et al. |
| 6,804,687 | B2 | 10/2004 | Sampson |
| 6,819,766 | B1 | 11/2004 | Weidong |
| 6,826,686 | B1 | 11/2004 | Peyravian |
| 6,829,712 | B1 | 12/2004 | Madoukh |
| 6,880,037 | B2 | 4/2005 | Boyer |
| 6,880,084 | B1* | 4/2005 | Brittenham et al. .......... 713/173 |
| 6,898,605 | B2 | 5/2005 | Constantino |
| 6,898,714 | B1 | 5/2005 | Nadalin et al. |
| 6,931,133 | B2 | 8/2005 | Andrews et al. |
| 6,941,326 | B2 | 9/2005 | Kadyk et al. |
| 6,970,970 | B2 | 11/2005 | Jung et al. |
| 6,978,933 | B2 | 12/2005 | Yap et al. |
| 6,986,040 | B1 | 1/2006 | Kramer et al. |
| 7,007,105 | B1 | 2/2006 | Sullivan et al. |
| 7,010,600 | B1 | 3/2006 | Prasad et al. |
| 7,050,589 | B2 | 5/2006 | Kwan |
| 7,051,213 | B1 | 5/2006 | Kobayashi et al. |
| 7,085,386 | B2 | 8/2006 | Audebert et al. |
| 7,114,028 | B1 | 9/2006 | Green et al. |
| 7,156,302 | B2 | 1/2007 | Yap et al. |
| 7,159,763 | B2 | 1/2007 | Yap et al. |
| 7,185,018 | B2 | 2/2007 | Archbold et al. |
| 7,251,728 | B2 | 7/2007 | Toh et al. |
| 7,278,581 | B2 | 10/2007 | Ong |
| 7,299,364 | B2 | 11/2007 | Noble et al. |
| 7,302,585 | B1 | 11/2007 | Proudler et al. |
| 7,356,688 | B1 | 4/2008 | Wang |
| 7,374,099 | B2 | 5/2008 | de Jong |
| 7,386,705 | B2 | 6/2008 | Low et al. |
| 7,437,757 | B2 | 10/2008 | Holdsworth |
| 7,451,921 | B2 | 11/2008 | Dowling et al. |
| 7,475,250 | B2 | 1/2009 | Aull et al. |
| 7,475,256 | B2 | 1/2009 | Cook |
| 7,480,384 | B2 | 1/2009 | Peyravian et al. |
| 7,502,793 | B2 | 3/2009 | Snible et al. |
| 7,571,321 | B2 | 8/2009 | Appenzeller et al. |
| 7,602,910 | B2 | 10/2009 | Johansson et al. |
| 7,702,917 | B2 | 4/2010 | Tevosyan et al. |
| 7,769,996 | B2 | 8/2010 | Randle et al. |
| 7,822,209 | B2 | 10/2010 | Fu et al. |
| 7,860,243 | B2 | 12/2010 | Zheng et al. |
| 2001/0008012 | A1 | 7/2001 | Kausik |
| 2001/0036276 | A1 | 11/2001 | Ober et al. |
| 2001/0054148 | A1 | 12/2001 | Hoornaert et al. |
| 2002/0004816 | A1 | 1/2002 | Vange et al. |
| 2002/0007351 | A1 | 1/2002 | Hillegass et al. |
| 2002/0007359 | A1 | 1/2002 | Nguyen |
| 2002/0010679 | A1 | 1/2002 | Felsher |
| 2002/0029343 | A1 | 3/2002 | Kurita |
| 2002/0056044 | A1 | 5/2002 | Andersson |
| 2002/0059144 | A1 | 5/2002 | Meffert et al. |
| 2002/0064095 | A1 | 5/2002 | Momich et al. |
| 2002/0080958 | A1 | 6/2002 | Ober et al. |
| 2002/0099727 | A1 | 7/2002 | Kadyk et al. |
| 2002/0112156 | A1 | 8/2002 | Gien et al. |
| 2002/0120842 | A1 | 8/2002 | Bragstad et al. |
| 2002/0133707 | A1 | 9/2002 | Newcombe |
| 2002/0171546 | A1 | 11/2002 | Evans et al. |
| 2002/0184149 | A1* | 12/2002 | Jones ............................ 705/41 |
| 2002/0188848 | A1 | 12/2002 | Buttiker |
| 2003/0005291 | A1 | 1/2003 | Burn |
| 2003/0012386 | A1 | 1/2003 | Kim et al. |
| 2003/0028664 | A1 | 2/2003 | Tan et al. |
| 2003/0035548 | A1 | 2/2003 | Kwan |
| 2003/0056099 | A1 | 3/2003 | Asanoma et al. |
| 2003/0075610 | A1 | 4/2003 | Ong |
| 2003/0093695 | A1 | 5/2003 | Dutta |
| 2003/0115455 | A1 | 6/2003 | Aull et al. |
| 2003/0115466 | A1 | 6/2003 | Aull et al. |
| 2003/0115467 | A1 | 6/2003 | Aull et al. |
| 2003/0115468 | A1 | 6/2003 | Aull et al. |
| 2003/0167399 | A1 | 9/2003 | Audebert et al. |
| 2003/0172034 | A1 | 9/2003 | Schneck et al. |
| 2004/0042620 | A1 | 3/2004 | Andrews et al. |
| 2004/0053642 | A1 | 3/2004 | Sandberg et al. |
| 2004/0066274 | A1 | 4/2004 | Bailey |
| 2004/0088562 | A1 | 5/2004 | Vassilev et al. |
| 2004/0096055 | A1 | 5/2004 | Williams et al. |
| 2004/0103324 | A1 | 5/2004 | Band |
| 2004/0103325 | A1 | 5/2004 | Priebatsch |
| 2004/0120525 | A1 | 6/2004 | Miskimmin et al. |
| 2004/0144840 | A1 | 7/2004 | Lee et al. |
| 2004/0146163 | A1 | 7/2004 | Asokan et al. |
| 2004/0153451 | A1 | 8/2004 | Phillips et al. |
| 2004/0162786 | A1 | 8/2004 | Cross et al. |
| 2004/0162903 | A1* | 8/2004 | Oh ............................... 709/228 |
| 2004/0230831 | A1 | 11/2004 | Spelman et al. |
| 2005/0015281 | A1* | 1/2005 | Clark et al. .................. 705/2 |
| 2005/0022123 | A1 | 1/2005 | Costantino |
| 2005/0033703 | A1 | 2/2005 | Holdsworth |
| 2005/0044385 | A1* | 2/2005 | Holdsworth ............... 713/185 |
| 2005/0109841 | A1 | 5/2005 | Ryan et al. |
| 2005/0114673 | A1 | 5/2005 | Raikar et al. |
| 2005/0119978 | A1 | 6/2005 | Ates |
| 2005/0123142 | A1 | 6/2005 | Freeman et al. |
| 2005/0124407 | A1* | 6/2005 | Rowe ............................ 463/25 |
| 2005/0138386 | A1 | 6/2005 | Le Saint |
| 2005/0138390 | A1 | 6/2005 | Adams et al. |
| 2005/0144312 | A1 | 6/2005 | Kadyk et al. |
| 2005/0149761 | A1* | 7/2005 | Chiviendacz et al. ........ 713/202 |
| 2005/0184163 | A1 | 8/2005 | de Jong |
| 2005/0184164 | A1 | 8/2005 | de Jong |
| 2005/0184165 | A1* | 8/2005 | de Jong ........................ 235/492 |
| 2005/0188360 | A1 | 8/2005 | de Jong |
| 2005/0216732 | A1 | 9/2005 | Kipnis et al. |
| 2005/0262361 | A1 | 11/2005 | Thibadeau |
| 2005/0279827 | A1 | 12/2005 | Mascavage et al. |
| 2005/0289652 | A1 | 12/2005 | Sharma et al. |
| 2006/0005028 | A1 | 1/2006 | Labaton |
| 2006/0010325 | A1 | 1/2006 | Liu et al. |
| 2006/0015933 | A1 | 1/2006 | Ballinger et al. |
| 2006/0036868 | A1 | 2/2006 | Cicchitto |
| 2006/0043164 | A1 | 3/2006 | Dowling et al. |
| 2006/0072747 | A1 | 4/2006 | Wood et al. |
| 2006/0073812 | A1 | 4/2006 | Punaganti Venkata et al. |
| 2006/0075133 | A1 | 4/2006 | Kakivaya et al. |
| 2006/0075486 | A1* | 4/2006 | Lin et al. ........................ 726/20 |
| 2006/0101111 | A1 | 5/2006 | Bouse et al. |
| 2006/0101506 | A1 | 5/2006 | Gallo et al. |
| 2006/0173848 | A1 | 8/2006 | Peterson et al. |
| 2006/0174104 | A1 | 8/2006 | Crichton et al. |
| 2006/0206932 | A1 | 9/2006 | Chong |
| 2006/0208066 | A1 | 9/2006 | Finn et al. |
| 2006/0226243 | A1 | 10/2006 | Dariel |
| 2006/0291664 | A1 | 12/2006 | Suarez et al. |
| 2006/0294583 | A1 | 12/2006 | Cowburn et al. |
| 2007/0014416 | A1 | 1/2007 | Rivera et al. |
| 2007/0074034 | A1 | 3/2007 | Adams et al. |
| 2007/0112721 | A1 | 5/2007 | Archbold et al. |
| 2007/0113267 | A1 | 5/2007 | Iwanski et al. |
| 2007/0113271 | A1 | 5/2007 | Pleunis |
| 2007/0118891 | A1 | 5/2007 | Buer |
| 2007/0162967 | A1* | 7/2007 | de Jong et al. ................. 726/9 |
| 2007/0169084 | A1 | 7/2007 | Frank et al. |
| 2007/0189534 | A1 | 8/2007 | Wood et al. |

(56) References Cited

U.S. PATENT DOCUMENTS

| | | |
|---|---|---|
| 2007/0204333 A1 | 8/2007 | Lear et al. |
| 2007/0230706 A1 | 10/2007 | Youn |
| 2007/0271601 A1 | 11/2007 | Pomerantz |
| 2007/0277032 A1 | 11/2007 | Relyea |
| 2007/0280483 A1 | 12/2007 | Fu |
| 2007/0282881 A1 | 12/2007 | Relyea |
| 2007/0283163 A1 | 12/2007 | Relyea |
| 2007/0283427 A1 | 12/2007 | Gupta et al. |
| 2007/0288745 A1 | 12/2007 | Kwan |
| 2007/0288747 A1 | 12/2007 | Kwan |
| 2008/0005339 A1 | 1/2008 | Kwan |
| 2008/0019526 A1 | 1/2008 | Fu |
| 2008/0022086 A1 | 1/2008 | Ho |
| 2008/0022088 A1 | 1/2008 | Fu et al. |
| 2008/0022121 A1 | 1/2008 | Fu et al. |
| 2008/0022122 A1 | 1/2008 | Parkinson et al. |
| 2008/0022128 A1 | 1/2008 | Proudler et al. |
| 2008/0034216 A1 | 2/2008 | Law |
| 2008/0046982 A1 | 2/2008 | Parkinson |
| 2008/0052698 A1 * | 2/2008 | Olson et al. .................. 717/168 |
| 2008/0056496 A1 | 3/2008 | Parkinson |
| 2008/0059790 A1 | 3/2008 | Parkinson |
| 2008/0059793 A1 | 3/2008 | Lord et al. |
| 2008/0069338 A1 | 3/2008 | Relyea |
| 2008/0069341 A1 | 3/2008 | Relyea |
| 2008/0072283 A1 | 3/2008 | Relyea |
| 2008/0077794 A1 | 3/2008 | Arnold et al. |
| 2008/0077803 A1 | 3/2008 | Leach et al. |
| 2008/0133514 A1 | 6/2008 | Relyea |
| 2008/0148047 A1 | 6/2008 | Appenzeller et al. |
| 2008/0189543 A1 | 8/2008 | Parkinson |
| 2008/0209224 A1 | 8/2008 | Lord |
| 2008/0209225 A1 | 8/2008 | Lord |
| 2009/0003608 A1 | 1/2009 | Lee et al. |
| 2009/0133107 A1 | 5/2009 | Thoursie |
| 2010/0313027 A1 | 12/2010 | Taylor |

FOREIGN PATENT DOCUMENTS

| | | | |
|---|---|---|---|
| WO | WO 2004019190 A1 * | 3/2004 | |
| WO | 2007096590 A1 | 8/2007 | |

OTHER PUBLICATIONS

ATM and Credit Card Notification, Feb. 2005 (internet archive) pp. 1-2 www.thereareplaces.com/infgdes/money.atmnotif.htm.

AMD Announces Specification for Open Platform Management Architecture, Feb. 28, 2005, pp. 1-2 http://www.thefreelibrary.com/AMD+Announces+Specification+for+Open+Platform+Management+Architecture-a0129342307.

Bellvin and Merritt, "Augmented Encrypted Key Exchange: a Password-Based Protocol Secure Against Dictionary Attacks and Password File Compromise", Proceedings of the 1st ACM Conference on Computer and Communications Security, Nov. 1993.

Schneier, "Applied Cryptography: Protocols, Algorithms, and Secure Code in C", 1996, John Wiley & Sons, Inc., Second Edition, pp. 455-456.

Zuccherato, Robert, Elliptic Curve Cryptography Support in Entrust, May 9, 2000.

Red Hat Certificate System, http://www.redhat.com/f/pdf/rhas/DirSecProductSheetCertificateSystem.pdf, Jun. 2005.

PKCS# v2.20: Cryptographic Token Interface Standard, RSA Laboratories, Jun. 28, 2004 (see, e.g. Chapter 10, Objects) (see www.rsasecurity.com, 407 pages).

Cryptographic Message Syntax, R. Housley, Request for Comments (RFC) 2630, Network Working Group, The Internet Society, Jun. 1999.

Balfanz (Dirk ABalfanz, "Access Control for Ad-Hoc Collaboration", Princeton University Jan. 2001).

* cited by examiner

US 9,081,948 B2

CONFIGURABLE SMARTCARD

FIELD

This invention generally relates to secure distributed systems. More particularly, the invention relates to a method and system for a configurable smartcard.

DESCRIPTION OF THE RELATED ART

Smart cards are not merely a piece of plastic with a strip of magnetic material. Smart cards also store and process information. Smart cards are storage devices with the core mechanics to facilitate communication with a reader or coupler. They have file system configurations and the ability to be partitioned into public and private spaces that can be made available or locked. They also have segregated areas for protected information, such as certificates, e-purses, and entire operating systems. In addition to traditional data storage states, such as read-only and read/write, some vendors are working with sub-states best described as "add only" and "update only."

The physical characteristics of smart cards are governed by international standards. For example, the size of a card is covered by ISO-7810. ISO-7816 and subsequent standards cover manufacturing parameters, physical and electrical characteristics, location of the contact points, communication protocols, data storage, and more. Data layout and format, however, can vary from vendor to vendor.

Smart cards are a way to increase security especially for enterprise systems. Enterprise system often contain valuable information such as financial data, personnel records, strategies, etc., that may be critical for the entity administrating the enterprise system. Moreover, smart cards may offer a method to control access to data within the enterprise systems. Accordingly, the reasons to use smart card are plentiful.

Typically, when inserting a smart card, the computer may acknowledge the smart card. However, beyond this acknowledgment, there is typically no other response by the computer.

SUMMARY

An embodiment relates generally to a method of using a token. The method includes embedding the token with at least one action and detecting a presence of the token. The method also includes authenticating the token; and executing an applet in response to a valid authentication of the token.

Another embodiment pertains generally to a system for a configurable token. The system includes a server configured to provide application and data services and a token management system configured to be executed on the server. The system also includes at least one client coupled with the server and a token configured with an applet. The system also includes a security client configured to be executed on the at least one client. The security client is configured to enroll a token with the token management system and execute the applet in response to the completion of the enrollment of the token.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of secure systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to systems, apparatus, and methods for managing a token. More particularly, a token applet may be embedded on token, such as a smart card. The token applet may be configured to execute user-specified instructions. For example, if the token was issued by a bank, the token applet may be configured to direct the user to the home account site as an authenticated user. Accordingly, the token applet may comprise of instructions to perform a pre-determined task.

Figure 1:
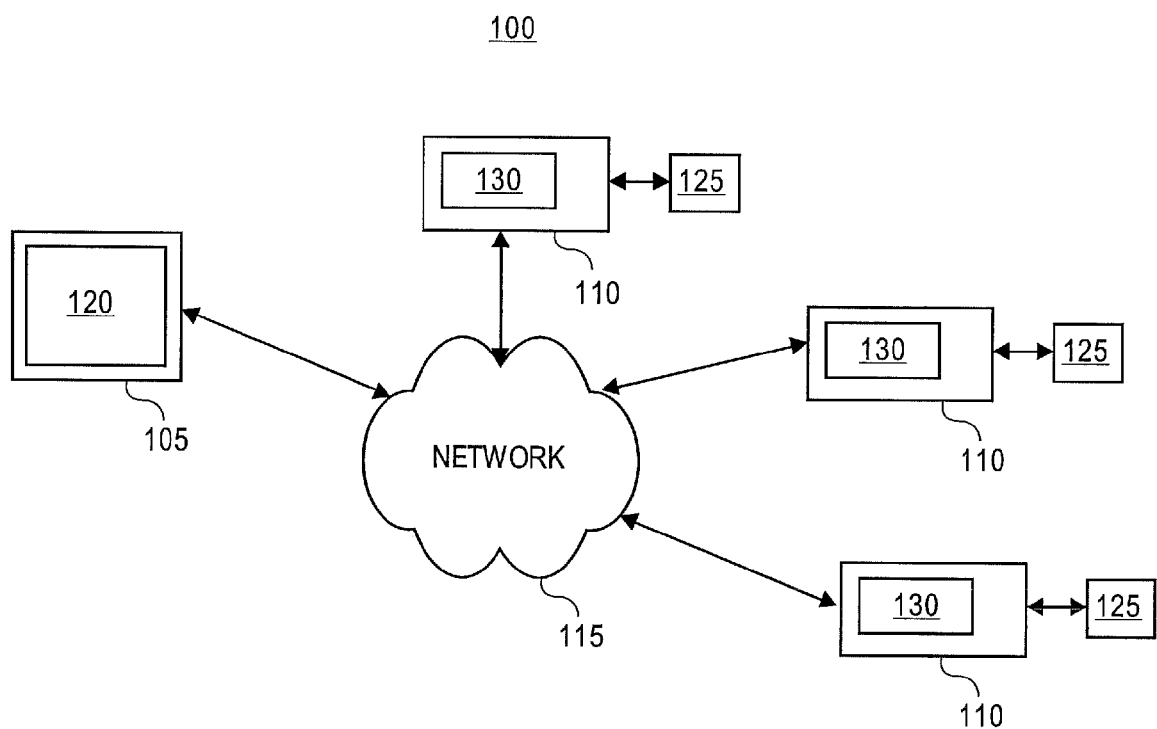
FIG. 1 illustrates an exemplary system in accordance with an embodiment.

FIG. 1 illustrates an exemplary secure system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the secure system 100 includes a server 105, clients 110 and a local network 115. The server 105 may be a computing machine or platform configured to execute a token management system 120 through a multiple user operating system (not shown) in conjunction with the clients 110. The server 105 may be implemented with server platforms as known to those skilled in the art from Intel, Advanced Micro Devices, Hewlett-Packard, etc.

The server 105 may interact with the clients over the local network 115. The local network 115 may be a local area network implementing an established network protocol such as Ethernet, token ring, FDDI, etc. The local network 15 provides a communication channel for the server 105 and clients 110 to exchange data and commands.

The clients 110 may be computing machine or platform configured to execute secure and open applications through the multi-user operating system. The clients 110 may be implemented with personal computers, workstations, thin clients, thick clients, or other similar computing platform. The clients 110 may use operating systems such as Linux, Windows, Macintosh or other available operating system.

Each client 110 may be configured to interface with a security device 125. The security device 125 may be configured to act as a gatekeeper to the client 110. More particularly, a user may use a security token (not shown), such as a smart card, to access the respective client 110. Each client 110 may have a security client 130 executing to monitor the security device 125.

The security client 130 may be configured to manage the token. More specifically, the security client 130 may enroll the token, recover keys for the token or reset a personal identification number for the token. The security client 130 may also be configured to interface with the token management system 120 and act as a proxy for application program data units (APDUs) between the token management system 120 and the token. The security client 130 may be further configured to display user interfaces as the token management system 120 directs, i.e., prompting the user for credentials and/or PIN, displaying token status.

Figure 2:
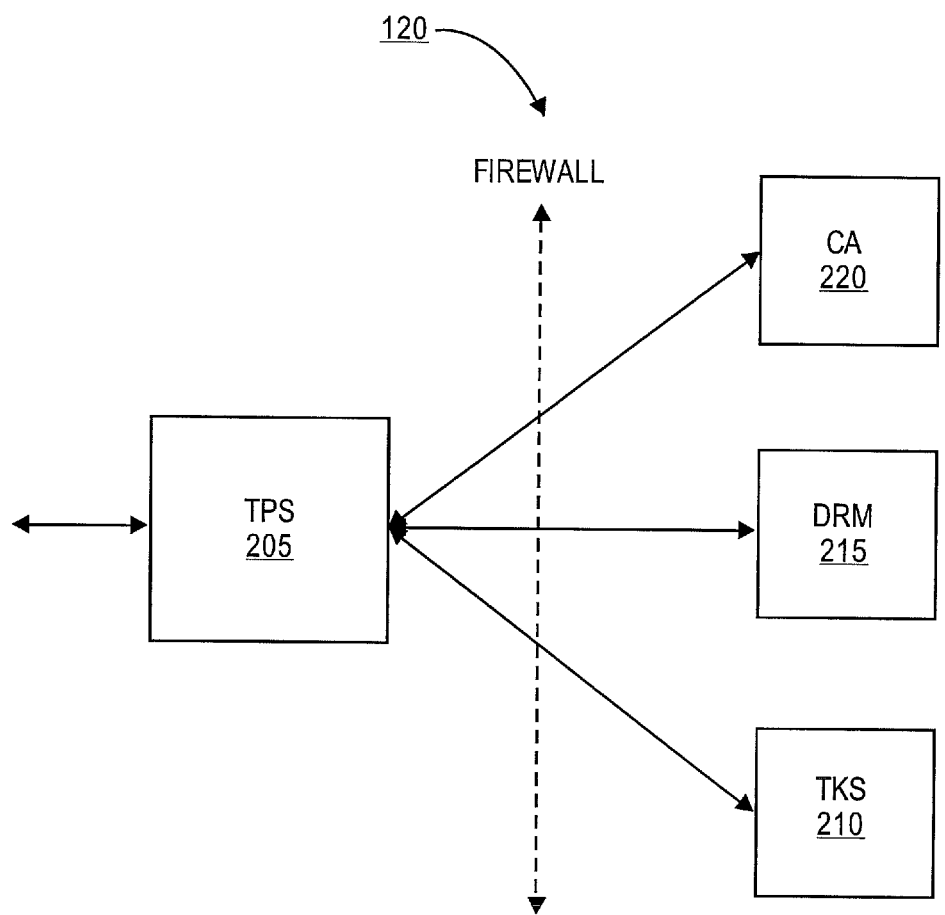
FIG. 2 illustrates a block diagram of a certificate server in accordance with another embodiment.

The token management system 120 comprises several modules, as depicted in FIG. 2. FIG. 2 shows an exemplary architecture of the token management system 120 in accordance with another embodiment. It should be readily apparent to those of ordinary skill in the art that the token management system 120 depicted in FIG. 2 represents a generalized schematic illustration and that other components may be added or existing components may be removed or modified. Moreover, the token management system 120 may be implemented using software components, hardware components, or combinations thereof.

As shown in FIG. 2, the token management system 120 includes a token processing system (labeled as TPS in FIG. 2) 205, a token key service (TKS) module 210, a data recovery manager (DRM) module 215 and a certificate authority (CA) module 220. The TPS 205 may be configured to act as a registration authority. The TPS 205 may direct the enrollment process. The TPS 205 may also be configured to act as a gateway between security clients 130 and tokens and the modules of the token management system 120.

The TKS module 210 may be configured to maintain master keys for the tokens. The TKS module 210 may also store symmetric keys associated with the token. These keys may be derived from a single master key combined with smart card serial number or identification number, i.e., the CID. The manufacturer of the smart card may store these symmetric keys onto the token. The manufacturer may also forward the single master key to the administrator of the token management system 120, who installs the key into the TKS module 210.

The DRM module 215 may be configured to maintain a database of encrypted subject's private keys, which can be recovered on demand by an appropriate process.

The CA module 220 may be configured to generate X.509 certificates in response to received subject public key information and certificate enrollment requests.

Figure 3:
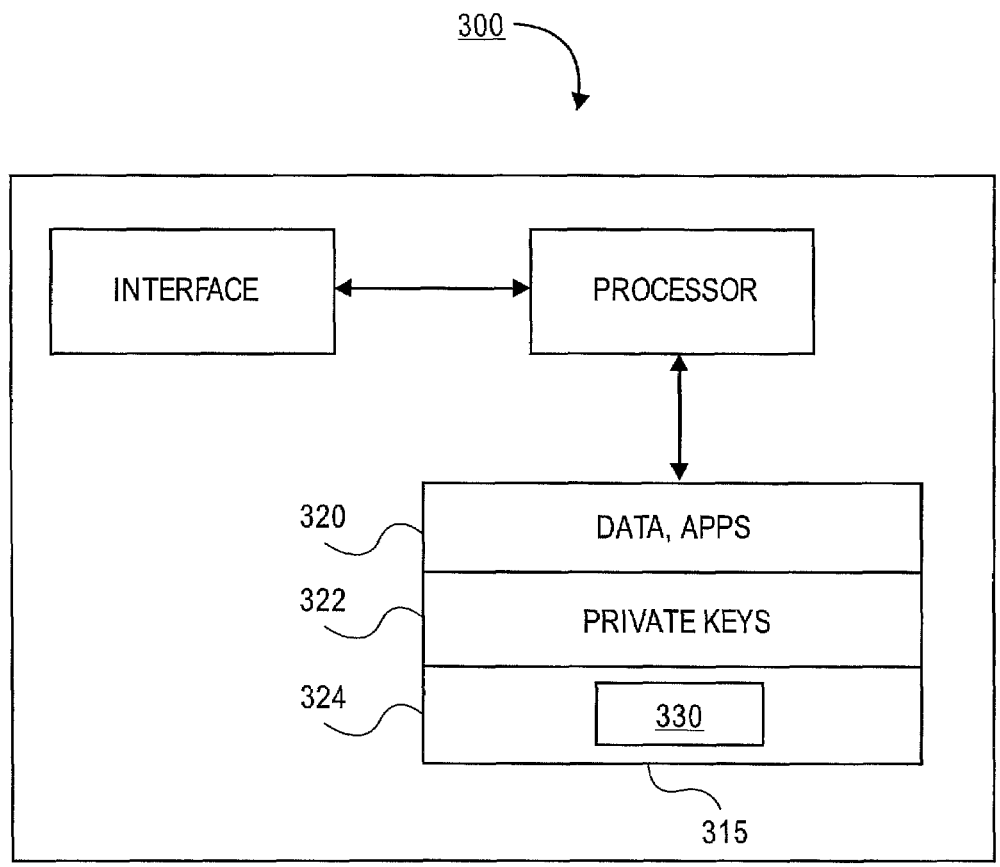
FIG. 3 illustrates an exemplary token in accordance with yet another embodiment.

FIG. 3 illustrates an exemplary token 300 in accordance with yet another embodiment. It should be readily apparent to those of ordinary skill in the art that the token 300 depicted in FIG. 3 represents a generalized schematic illustration and that other components may be added or existing components may be removed or modified.

As shown in FIG. 3, the token 300 includes an interface 305, a processor 310, and memory 315. The interface 305, the processor 310 and the memory 315 may be implemented with an application specific integrated circuit, field programmable gate array, or other similar technologies.

The interface 305 may be configured as communication conduit for data between the token and the security client 130. The interface 305 may comply with existing smart card interface standards as known to those skilled in the art. The processor 310 may be configured to provide a computing platform for the functions of the token 300. For example, the processor 310 can transfer data, execute applets stored in the memory 315. The memory 315 may be configured to securely store information such as private keys, data, applets (small applications). The memory 315 may be partitioned into blocks 320-324.

Accordingly, the token 300 may be configured to store a token applet 330 in accordance with various embodiments. More specifically, the token applet 330 may be small program of instructions which may direct the security client 130 to perform a predefined task. The token applet 330 may be written in an appropriate computer language such as C, C++, Perl, Java, Extended Markup Language ("XML"), or other similar language. For example, the token applet 330 may direct the security client 130 to connect with a predetermined website after enrollment or a valid authentication. The predetermined website may be a secure site but since the token 300 had previously been authenticated, the security client 130 may access the predetermined website. Refining the previous example, the token 300 may be issued by a stock trading company. After enrolling the token 300, the token applet 330 may be configure to connect with the user's web page at the stock trading company web site (each web site being identified by a universal resource locater ("URL")), where the authentication process between the user and the web page has already been accomplished.

Another example is the token applet 330 may direct the security client 130 to retrieve a data file at a predetermined location as defined by a URL. The data file may contain instructions for the security client 130 to execute. Again the data file may be implemented in a computer language such as C++, Java, Perl or other similar languages. Accordingly, a configurable token may be implemented that permits authenticated access for the user.

Figure 4:
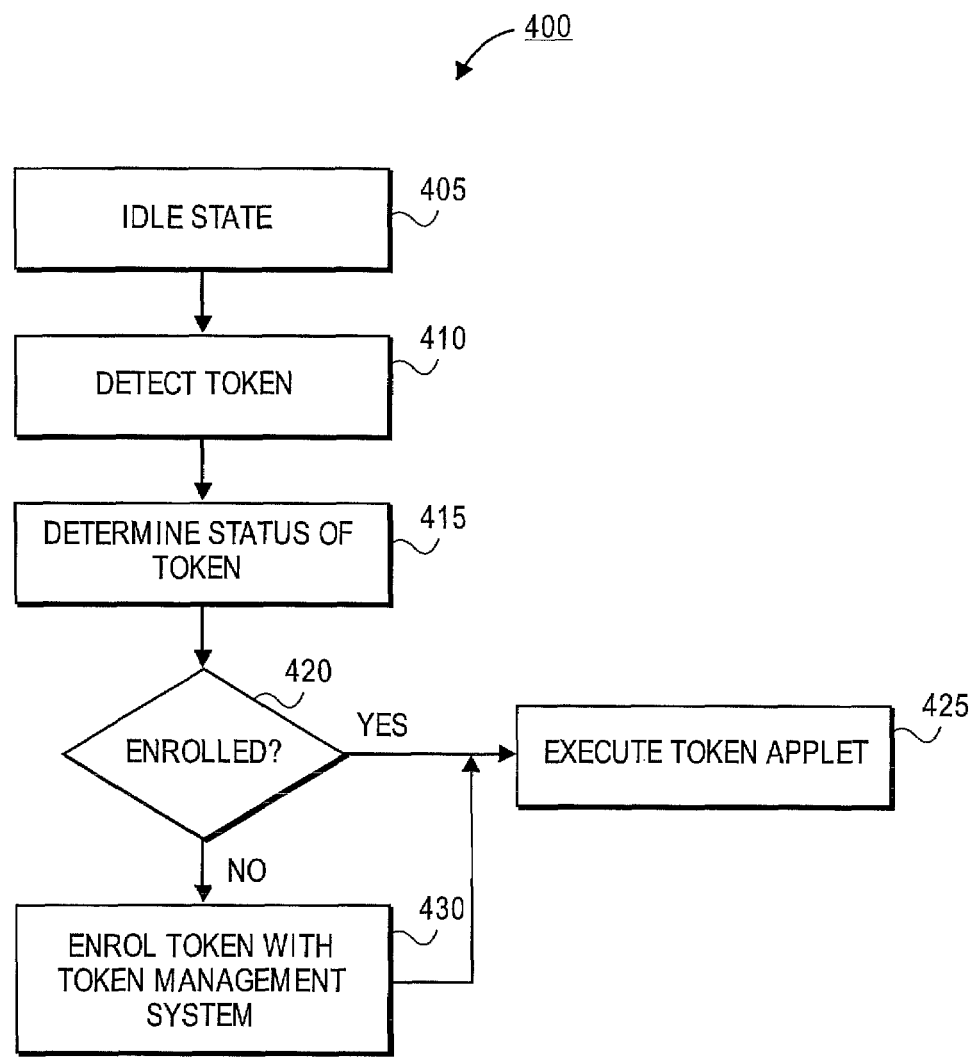
FIG. 4 illustrates a flow diagram in accordance with yet another embodiment.

FIG. 4 illustrates a flow diagram 400 implemented by the security client 130 in accordance with yet another embodiment. It should be readily apparent to those of ordinary skill in the art that the flow diagram 400 depicted in FIG. 4 represents a generalized schematic illustration and that other steps may be added or existing steps may be removed or modified. Moreover, the implementation of flow diagram 400 may be as computer readable program code in a computer language such as C, C++, PASCAL, etc.

As shown in FIG. 4, the security client 130 may initially be in an idle state, in step 405. The security client 130 may have been invoked during the boot-up process of the client 110. A user may insert a token, e.g., token 300, into the security device 125 of the client 110. In step 410, the security client 130 may detect the presence of the inserted token 300.

In step 415, the security client 130 may determine a status of the token 300. If the token has already been initialized and bound to a user, i.e., enrolled, in step 420, the security client 130 may be configured to retrieve and execute the token applet 330 for the client 110, in step 425.

Otherwise, if the security client 130 determines that the inserted token 300 has not been enrolled, in step 420, the security client 130 may be configured to enroll the token 300. More specifically, the security client 130 may send a request to the token management 200 to generate keys and certificates for the inserted token 300 that bind the token 300 to the user. Additional details of enrolling a token may be found in commonly assigned U.S. patent application Ser. No. 11/446,957 entitled "Methods and Systems for Server Side Key Generation," filed on Jun. 6, 2006 and concurrently filed U.S. Patent Application entitled "Methods and System for Phone Home Certification, which are incorporated in their entirety be reference. Subsequently, the security client 130 may execute the token applet 330, in step 425 after receiving the requested keys and/or certificates.

Figure 5:
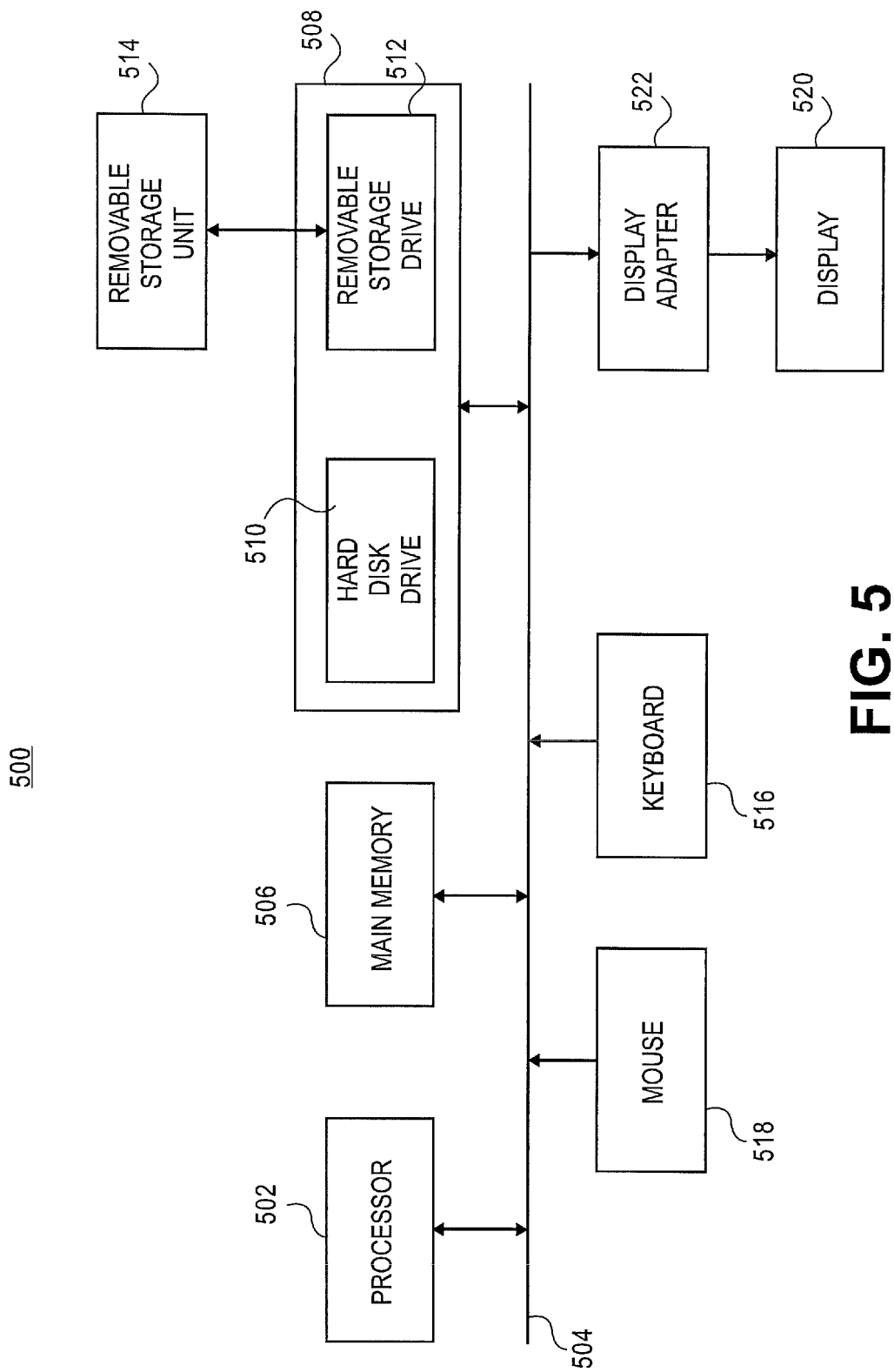
FIG. 5 illustrates an exemplary computing platform.

FIG. 5 illustrates an exemplary block diagram of a computing platform 500 where an embodiment may be practiced. The functions of the security client and token management system may be implemented in program code and executed by the computing platform 500. The security client and token management system may be implemented in computer languages such as PASCAL, C, C++, JAVA, etc.

As shown in FIG. 5, the computer system 500 includes one or more processors, such as processor 502 that provide an execution platform for embodiments of the security client and token management system. Commands and data from the processor 502 are communicated over a communication bus 504. The computer system 500 also includes a main memory 506, such as a Random Access Memory (RAM), where the security client and token management system may be executed during runtime, and a secondary memory 508. The secondary memory 508 includes, for example, a hard disk drive 510 and/or a removable storage drive 512, representing a floppy diskette drive, a magnetic tape drive, a compact disk drive, etc., where a copy of a computer program embodiment for the security client and token management system may be stored. The removable storage drive 512 reads from and/or writes to a removable storage unit 514 in a well-known manner. A user interfaces with the security client and token management system with a keyboard 516, a mouse 518, and a display 520. A display adapter 522 interfaces with the communication bus 504 and the display 520. The display adapter also receives display data from the processor 502 and converts the display data into display commands for the display 520.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:

detecting a presence of a token device at a client, wherein the token device comprises an embedded applet;

in response to determining that the token device is not bound to a user, enrolling, by a processor, the token device to bind the token device to the user;

in response to a valid authentication of the token device, receiving, by the client, the embedded applet from the token device, wherein the embedded applet is in an Extended Markup Language (XML) based format, wherein the embedded applet specifies a task to be performed upon the valid authentication of the token device, wherein the task is to be performed by a client application previously installed on the client, and wherein the valid authentication of the token device is based on a token key derived from a master key and an identification number associated with the token device; and performing, by the client application, the task specified by the received embedded applet in response to an execution of the embedded applet and the valid authentication of the token device, the task comprising retrieving, via a network, a data file from a location specified by the embedded applet and accessing, via a browser, a secure website using the valid authentication of the token device in view of the data file.

2. The method of claim 1, wherein the valid authentication of the token device comprises requesting for authentication information and validating the authentication information.

3. The method of claim 1, wherein the secure website is identified by a universal resource locator.

4. The method of claim 1, wherein the data file comprises instructions to be executed by the client.

5. The method of claim 4, wherein the instructions are implemented in a computer language.

6. A non-transitory computer-readable medium comprising instructions that, when executed by a processor, cause the processor to:

detect a presence of a token device at a client, wherein the token device comprises an embedded applet;

in response to determining that the token device is not bound to a user, enroll, by the processor, the token device to bind the token device to the user;

in response to a valid authentication of the token device, receive, by the processor of the client, the embedded applet from the token device, wherein the embedded applet is in an Extended Markup Language (XML) based format, wherein the embedded applet specifies a task to be performed upon the valid authentication of the token device, wherein the task is to be performed by a client application previously installed on the client, and wherein the valid authentication of the token device is based on a token key derived from a master key and an identification number associated with the token device; and perform, by the client application, the task specified by the received embedded applet in response to an execution of the embedded applet and the valid authentication of the token device, the task comprising retrieving, via a network, a data file from a location specified by the embedded applet and accessing, via a browser, a secure website using the valid authentication of the token device in view of the data file.

7. A system comprising:
a computing client;
a token device with an embedded applet; and
a security client to be executed on the computing client, wherein the security client is to:
- detect a presence of the token device at the computing client;
- in response to determining that the token device is not bound to a user, enroll the token device with a token management system to bind the token device to the user;
- in response to a completion of the enrollment of the token device, receive the embedded applet from the token device, wherein the embedded applet is in an Extended Markup Language (XML) based format, wherein the embedded applet specifies a task to be performed upon the completion of the enrollment of the token device, wherein the task is to be performed by a client application previously installed on the computing client, and wherein the valid authentication of the token device is based on a token key derived from a master key and an identification number associated with the token device; and
- perform, by the client application previously installed on the computing client, the task specified by the received embedded applet in response to an execution of the embedded applet and the valid authentication of the token device, the task comprising retrieving, via a network, a data file from a location specified by the embedded applet and accessing, via a browser, a secure website using the valid authentication of the token device in view of the data file.

8. The system of claim 7, wherein the security client is further to request authentication information from the token device and validate the authentication information.

9. The system of claim 8, wherein the secure website is identified by a universal resource locator.

10. The system of claim 7, wherein the data file comprises instructions to be executed by the security client.

11. The system of claim 10, wherein the instructions are implemented in a computer language.

12. The system of claim 10, wherein the security client is to display a web page from the secure website.

13. The system of claim 12, wherein the embedded applet has authenticated access to the secure website.

14. The method of claim 1, further comprising:
acting, by the client, as a proxy for application program data units between a token management system and the token device.

15. The method of claim 1, wherein the token device comprises a smart card.

* * * * *